United States Patent
Oksman

(10) Patent No.: US 7,929,547 B2
(45) Date of Patent: Apr. 19, 2011

(54) NETWORKS HAVING PLURALITY OF NODES

(75) Inventor: Vladimir Oksman, Morganville, NJ (US)

(73) Assignee: Lantiq Deutschland GmbH, Neubiberg (DE)

(*) Notice: Subject to any disclaimer, the term of this patent is extended or adjusted under 35 U.S.C. 154(b) by 175 days.

(21) Appl. No.: 12/043,555

(22) Filed: Mar. 6, 2008

(65) Prior Publication Data

US 2009/0225774 A1 Sep. 10, 2009

(51) Int. Cl.
*H04L 12/28* (2006.01)
(52) U.S. Cl. .................. 370/395.4; 370/235; 370/447
(58) Field of Classification Search .................. None
See application file for complete search history.

(56) References Cited

U.S. PATENT DOCUMENTS

| 6,907,044 B1 * | 6/2005 | Yonge et al. ............ 370/445 |
| 6,987,770 B1 * | 1/2006 | Yonge, III ............... 370/401 |
| 7,298,691 B1 * | 11/2007 | Yonge et al. ............ 370/203 |
| 2007/0025386 A1 * | 2/2007 | Riedel et al. ............ 370/445 |
| 2007/0115907 A1 * | 5/2007 | Myles et al. ............. 370/338 |

OTHER PUBLICATIONS

"HomePlug AV White Paper", HomePlug Powerline Alliance Inc., Copyright 2005, 11 pgs., printed from the Internet at: www.homeplug.org/products/whitepapers.
Series G: Transmission Systems and Media, Digital Systems and Networks, Home networking transceivers—Enhanced physical, media access, and link layer specifications, ITU-T Recommendation G.9954, Jan. 2007, 276 pgs.

* cited by examiner

*Primary Examiner* — Donald L Mills
(74) *Attorney, Agent, or Firm* — Eschweiler & Associates, LLC

(57) ABSTRACT

One embodiment of the present invention relates to a method of communicating in a network with a plurality of nodes. In the method, information is gathered from the plurality of nodes, where information from each node specifies other nodes from which the node detected messages. Based on the gathered information, a transmit sequence according to which the plurality of nodes are to transmit is determined. Other methods and devices are also disclosed.

12 Claims, 6 Drawing Sheets

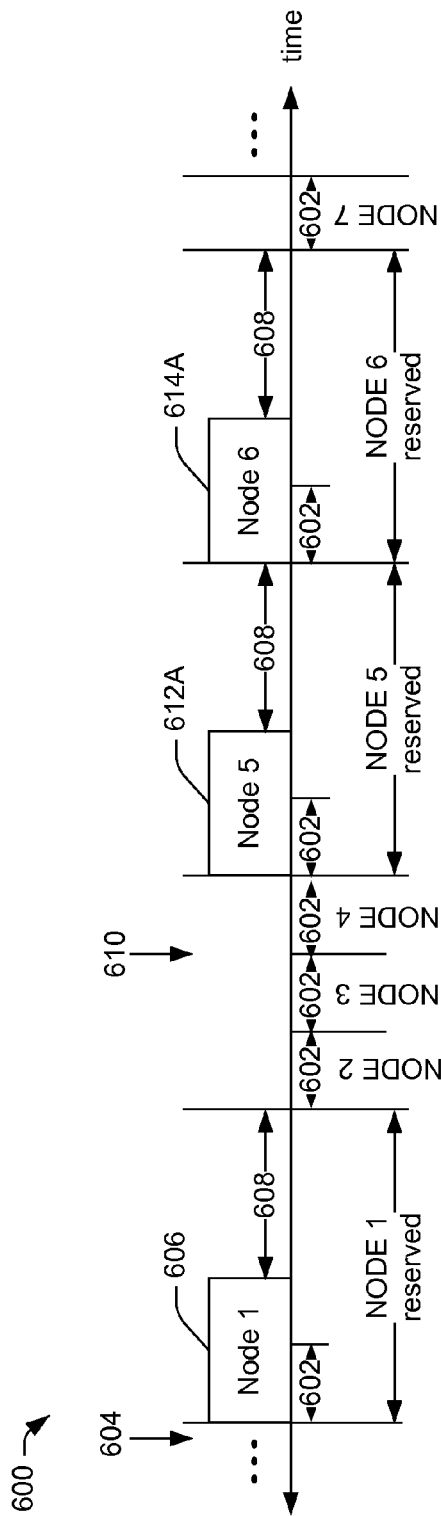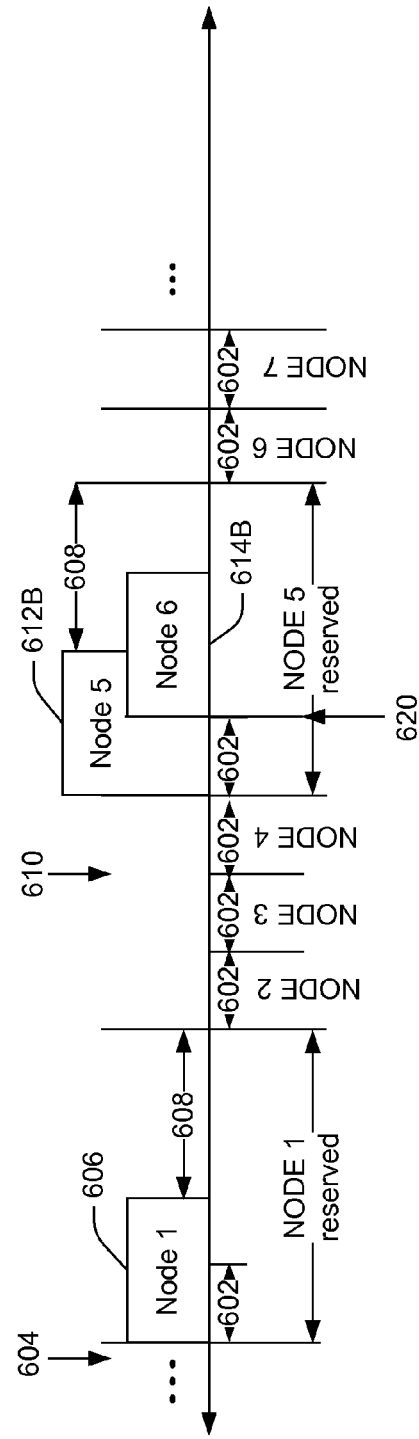
FIG. 6
FIG. 7

A
NETWORKS HAVING PLURALITY OF NODES

FIELD OF INVENTION

The present invention relates to generally to communication networks and more particularly to communication networks with a plurality of nodes.

BACKGROUND

In today's business climate, industry fortunes rise and fall on whether information is exchanged in an efficient manner. For example, cell phones, pagers, and the Internet have thrived because each technology allows businesses to exchange information over a network. Therefore, to satisfy our society's need for efficient exchange of information, there is an on-going need for improvements in networks.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a method of communicating in a network with a plurality of nodes. In the method, information is gathered from the plurality of nodes, where information from each node specifies other nodes from which the node detected a transmission. Based on the gathered information, a transmit sequence according to which the plurality of nodes are to transmit is determined. Other methods and devices are also disclosed.

The following description and annexed drawings set forth in detail certain illustrative aspects and implementations of the invention. These are indicative of but a few of the various ways in which the principles of the invention may be employed.

FIGURES

FIG. 6 shows one embodiment of a shared transmission opportunity associated with seven network nodes, such as $TXOP_N$ as previously depicted in FIG. 2;

FIG. 7 shows one embodiment of a shared transmission opportunity with hidden nodes that cause data errors during communication.

DETAILED DESCRIPTION OF THE INVENTION

Figure 1:
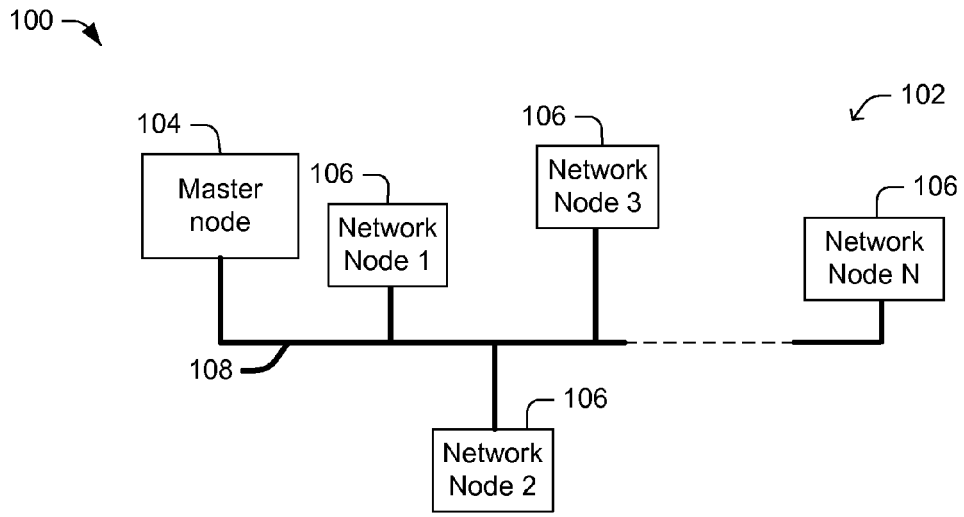
FIG. 1 illustrates one embodiment of a network that transmits data between nodes over a communication medium.

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

FIG. 1 illustrates a network 100 that comprises several nodes 102. The nodes 102 are coupled to a communication medium 108 over which they send and receive signals. Depending on the implementation, the communication medium 108 could be a wireless communication medium, a wireline communication medium (e.g., coaxial cable, twisted pair of copper wires, power line wiring, optical fiber, etc.), or combinations thereof. At least two types of nodes 102, namely a master node 104 and network nodes 106, are coupled to the communication medium 108. Depending on the implementation, the network nodes 106 could communicate with one another directly (peer-to-peer mode) or via the master node 104 (centralized mode).

In one embodiment, the network 100 is a home network and the master node 104 is an access point of the home network. For example, in this embodiment the master node 104 could be a residential gateway that distributes broadband services to the network nodes 106. The network nodes 106 could be associated with digital content destinations in the home, but could also be associated with digital content sources, such as digital video recorders (DVR), computers providing streaming video, televisions, entertainment centers, etc.

Because the master node 104 and the network nodes 106 share the same communication medium 108, which can only support up to some maximum total bandwidth, the total amount of information that can be transmitted per unit time over the network 100 is limited. Therefore, to ensure the network nodes 106 have sufficient bandwidth for their respective applications (e.g., IPTV, streaming video, etc.), communication among the nodes 102 should be properly structured. One consideration in structuring this communication is avoidance of signal interference between the nodes 102.

One common type of signal interference is collision-interference, which occurs when different nodes 102 transmit their signals at the same time, causing their signals to "collide" in the communication medium 108 and erase each other. For example, consider a scenario where an IPTV application is established between Network Nodes 1 and 2 where data signals are sent as IP packets of TV data. If another node 106 transmits a signal at the same time that an IP packet is transmitted between Network Nodes 1 and 2, the IP packet may be lost, causing "jitter" on the TV screen.

To structure communication to avoid collisions, the master node 104 is typically responsible for managing communications within the network 100. One way in which the master node 104 could manage communication is by regulating admission of network nodes 106 to the network 100. In this way, the master node 104 can keep track of the nodes 102 associated with the network 100 to facilitate the quality of service (QoS) requirements for the applications associated with those nodes.

Figure 2:
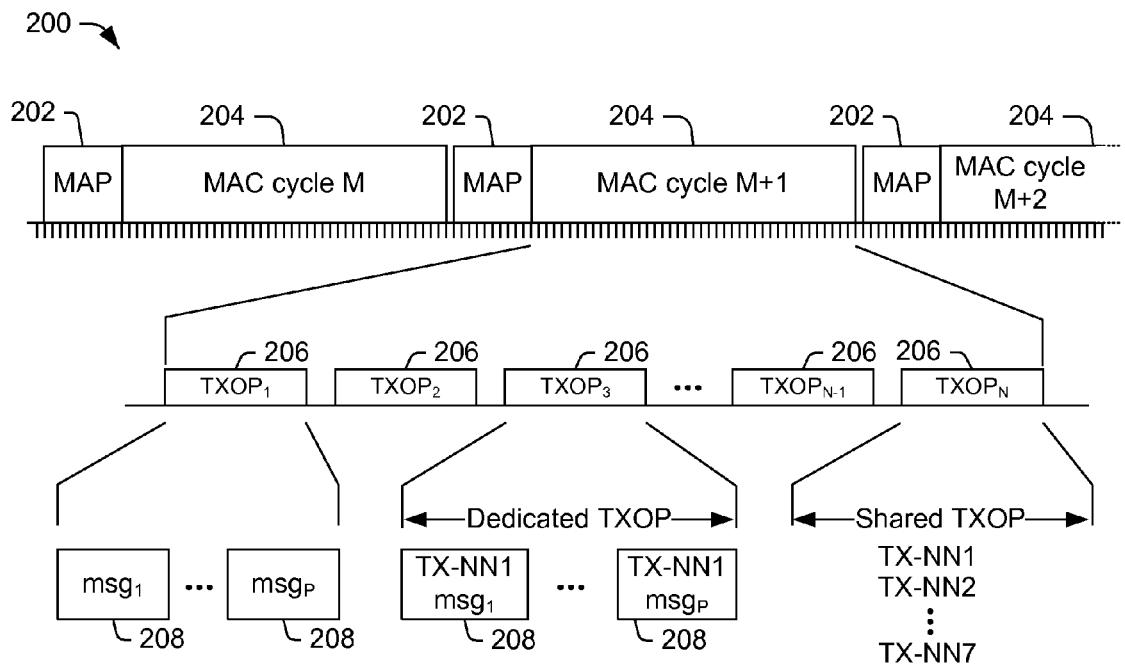
FIG. 2 shows one embodiment of a series of access cycles to communicate between nodes of the network in accordance with aspects of the invention.

The master node 104 can further manage communication within the network 100 by dividing the communication stream into media access cycles (also sometimes referred to as "MAC cycles"). FIG. 2 shows part of a communication stream 200 that includes three MAC cycles 204 (i.e., MAC cycle M, MAC cycle M+1, and MAC cycle M+2). The master node 104 transmits a time marker (also sometimes referred to as a "beacon signal") and a media access plan (MAP) 202 at the start of each MAC cycle 204. Each MAP 202 dictates a transmit sequence in which the admitted network nodes 106 are to transmit for the associated MAC cycle 204. Accordingly, a MAP dictates how much bandwidth is allocated to each node 102 for a given MAC cycle. In this way, as the network nodes 106 and their respective applications change over time, the master node 104 can change the MAP 202 for successive MAC cycles to ensure that the network nodes' quality-of-service (QoS) requirements are continuously met. If it is not possible to meet all QoS requirements, the master node 104 can prioritize which applications should maintain their QoS requirements.

As shown in FIG. 2, each MAC cycle 204 often includes a number of transmission opportunities 206. The starting time and duration for each of these transmission opportunities may be specified in the MAP. For example, for MAC cycle M+1, the MAP could specify N transmission opportunities 206 ($TXOP_1, TXOP_2, \ldots, TXOP_N$; where N could range from 1 up to a certain maximum value depending on the time resolution and duration of the MAC cycle). Although FIG. 2 shows an example where adjacent transmission opportunities are separated by gaps where all nodes may be substantially silent, in other examples the transmission opportunities may directly abut one another.

In typical embodiments, one or more messages could be transmitted during each transmission opportunity. During $TXOP_1$, for example, P messages 208 are transmitted (i.e., $msg_1, \ldots, msg_P$; where P could range from 0 to a certain maximum value depending on the time resolution and duration of the MAC cycle). The messages 208 within a transmission opportunity could be transmitted relative to the nodes in several ways.

In some embodiments, for example, a transmission opportunity can be a dedicated transmission opportunity and all the messages during the dedicated transmission opportunity will be transmitted from a single node. For example, $TXOP_3$ could be reserved exclusively for transmissions from Network Node1. Thus, during $TXOP_3$ network node1 can transmit P messages to be received by the master node 104 and/or the other network nodes 106. When Network Node 1 is transmitting during $TXOP_3$, the master node 104 and other network nodes are substantially silent, so as not to interfere with Network Node 1's transmissions. In this way, a network node can transmit its required data during a dedicated transmission opportunity without the other nodes interfering with its communication.

A transmission opportunity 206 could also be a shared transmission opportunity that is associated with multiple nodes. For example $TXOP_N$ shows a shared transmission opportunity that has been assigned to Network Node 1 through Network Node 7. Each network node may then transmit during the shared transmission opportunity. In one embodiment, the network nodes assigned to the shared transmission opportunity could be assigned timeslots within the shared transmission opportunity, but in other embodiments these network nodes could dynamically compete for the available bandwidth in the shared transmission opportunity according to a set of rules. More detailed examples of some illustrative embodiments are described further herein with respect to FIGS. 6-8.

In one embodiment, the rules used to compete for the medium are based on carrier sense (also known as Carrier Sense Media Access (CSMA)). Carrier sense is used to detect if one of the nodes has already grabbed the medium and started transmission. When a node detects the carrier (gets carrier sense), it becomes aware that another node is already transmitting and will wait to transmit to avoid collision. If several nodes are sharing the same TXOP and are allowed to compete for the medium during this TXOP, carrier sense is one way to avoid collisions.

One problem with carrier sense is caused by mutually hidden nodes, those which do not "see" each other. If, for instance, Network Node 1 is hidden from Network Node 2, Network Node 2 will not be able to detect the transmission of Node 1 (no carrier sense available). Thus, Node 2 may start transmission when Node 1 is transmitting causing collision of transmitted messages.

In various embodiments of the present invention, the master node 104 provides a MAP 202 where hidden nodes are assigned to different transmission opportunities 206. This advantageously reduces collisions between transmitting nodes, thereby improving the effective data rate for the network. The hidden nodes could be assigned to different dedicated transmission opportunities or to different shared transmission opportunities, depending on the particular situation. Further, in some embodiments, at least two nodes that can detect messages from one another are assigned to a shared transmission opportunity, although these nodes could also be assigned to different shared or dedicated transmission opportunities.

Figure 3:
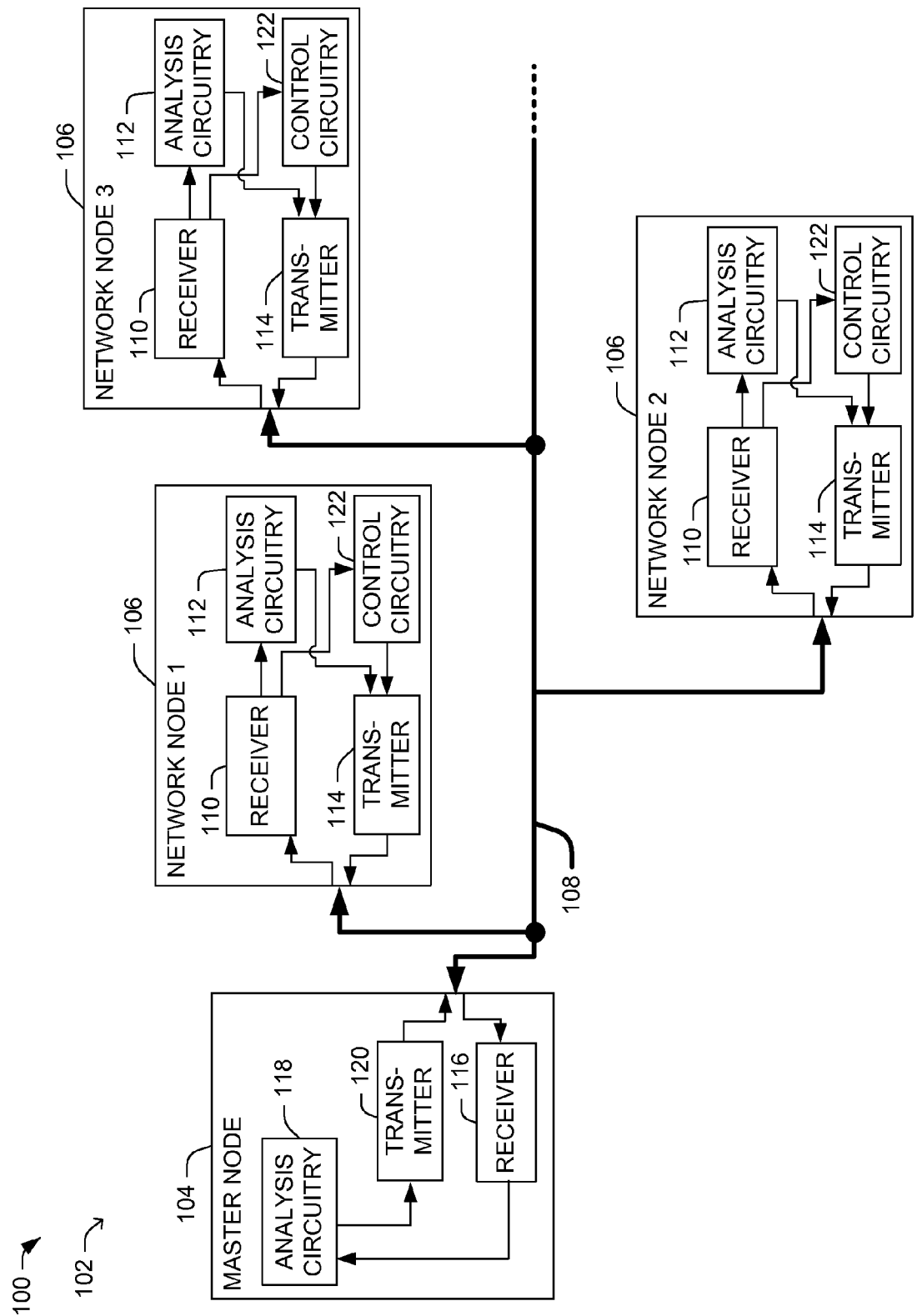
FIG. 3 illustrates one more detailed embodiment of a network that transmits data between nodes over a communication medium in accordance with aspects of the invention.

FIG. 3 shows a more detailed view of the master node 104 and several network nodes 106 in accordance with some aspects of the invention. As will be appreciated, this network 100 will operate such that those of nodes 102 that are hidden from one another will transmit during different transmission opportunities. To facilitate the desired functionality, the master node 104 includes analysis circuitry 118 that is operably coupled to a receiver 116 and a transmitter 120. Each network node 106 includes a receiver 110 and a transmitter 114 that are operably coupled to analysis circuitry 112 and control circuitry 122.

During network operation, the network nodes 106 monitor messages on the communication medium 108 and identify the other nodes from which the messages were transmitted. For example, Network Node 1 could use its receiver 110 to continuously or intermittently "listen" to messages on the communication medium 108. The node's analysis circuitry 112 could then determine whether the receiver 110 "heard" a message from Network Node 2, Network Node 3, . . . , and/or Network Node N. This monitoring could be performed, for example, on a continuous basis, during predefined intervals, or during dynamically assigned intervals.

After monitoring, the network nodes 106 could then send status messages to the master node 104. Each status message indicates the other nodes that a monitoring node "heard" during monitoring. For example, the analysis circuitry 112 of Network Node 1 could work with the node's transmitter 114 to transmit a status message indicating that Network Node 1 detected messages from Network Node 2, Network Node 3, . . . , and Network Node N (i.e., all network nodes are visible to Network Node 1). Network Node 5 and Network Node 6, by contrast, could transmit status messages indicating that they detected messages from all network nodes, except for one another (i.e., network node 5 is "hidden" from network node 6, and vice versa). In one embodiment, these status messages could be transmitted in bitmap format where each bit specifies whether or not the transmitting node can detect a message from a different node.

Further, each status message may allow a correlation between the transmitting network node and the identified other nodes. For example, in one embodiment, the transmitting network node may transmit its own node ID along with a list of the other node IDs from which it detected messages. In another embodiment, rather than transmitting its own node ID, the transmitting network node may transmit during an assigned time slot or frequency band such that the master node 104 may correlate the identified network nodes with the transmitting node. Other variations are also possible.

The Master node 104 collects status messages from all nodes during the monitoring period and compares them with the list of transmitting nodes during this period. The latter could be done based on TXOPs scheduled by the Master node or by analysis of messages on the network, since all nodes are usually "visible" by the Master node either directly or via a dedicated Proxy node assigned by the Master to repeat messages from the node which is hidden from the Master. Thus, the Master node has sufficient capabilities to identify all nodes in the network transmitted during the monitoring period.

The master node 104 then uses its receiver 116 to receive the status messages from the network nodes 106. The analysis circuitry 118 of the master node 104 then determines which nodes can (and can't) "hear" one another. In one embodiment, the analysis circuitry 118 could form a table from the status messages that cross-references which nodes can (and can't) detect messages from one another. For example, Table 1 below shows an example of a network configuration with seven network nodes, where all network nodes can detect messages from one another ("Yes"), except for network nodes 5 and 6 ("No") which are hidden nodes relative to one another:

TABLE 1

Example of network configuration with 7 network nodes.

| Node | 1 | 2 | 3 | 4 | 5 | 6 | 7 |
|------|---|---|---|---|---|---|---|
| 1 | N/A | Yes | Yes | Yes | Yes | Yes | Yes |
| 2 | Yes | N/A | Yes | Yes | Yes | Yes | Yes |
| 3 | Yes | Yes | N/A | Yes | Yes | Yes | Yes |
| 4 | Yes | Yes | Yes | N/A | Yes | Yes | Yes |
| 5 | Yes | Yes | Yes | Yes | N/A | No | Yes |
| 6 | Yes | Yes | Yes | Yes | No | N/A | Yes |
| 7 | Yes | Yes | Yes | Yes | Yes | Yes | N/A |

After mapping the network nodes 106 in this manner, the master node 104 assigns the network nodes 106 to a transmit sequence or multiple transmission opportunities. Nodes that are hidden from one another will be assigned to different transmission opportunities. Thus, in Table 1's example, the master node 104 will assign Node 5 to a different transmission opportunity from Node 6.

The master node 104 then transmits a control message, such as a MAP, that includes the transmission sequence to the network nodes 106. Transmitter 120 could facilitate this behavior.

The network nodes 106 receive the control message via their receivers 110. The network nodes 106 will then use their control circuitry 122 to parse the control message and configure their transmitter 114 to transmit according to the assigned transmit sequence in a subsequent MAC cycle.

Thus, in Table 1's example, Network Node 5 and Network Node 6 will transmit during different transmission opportunities.

Several embodiments of methods in accordance with aspects of the invention are now described with reference to FIGS. 4-5. The nodes 102 of the network 100 include suitable circuitry, state machines, firmware, software, logic, etc. to perform the various methods and functions illustrated and described herein, including but not limited to the methods described below. While the methods illustrated below are illustrated and described as a series of signal patterns, acts, or events, it will be appreciated that the present invention is not limited by the illustrated ordering of such signal patterns, acts, or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of networks which are illustrated and described herein (e.g., network 100 in FIG. 3) as well as in association with other systems not illustrated, wherein all such implementations are contemplated as falling within the scope of the present invention and the appended claims.

Figure 4:
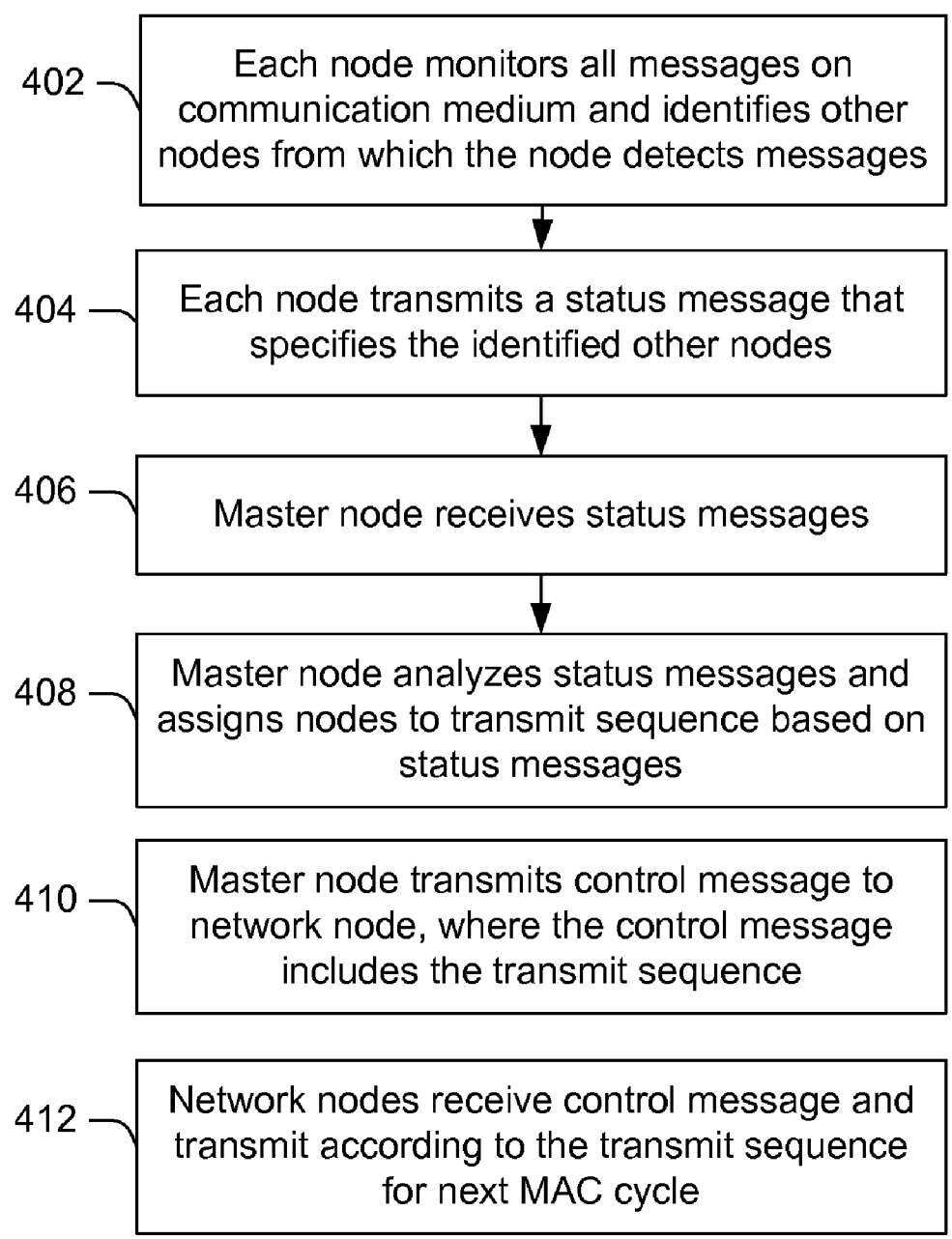
FIG. 4 shows a flowchart of an embodiment of adaptive communication in accordance with aspects of the invention.

Referring now to FIG. 4, one can see that method 400 starts at 402, where each node monitors all messages on the communication medium. Each node identifies other nodes from which the monitoring node can detect messages. In one embodiment the nodes can transmit messages with along with their node ID, so that the monitoring nodes can easily determine the identity of the transmitting node. In other embodiments, the nodes can transmit messages during respectively assigned timeslots that are known to all nodes, such that the monitoring nodes can correlate the detected messages to the transmitting nodes. In still other embodiments, the nodes can transmit messages over respectively assigned frequencies or modulation methods that are known to all nodes, such that the monitoring nodes can correlate the detected messages to the transmitting nodes. Other variations are also possible.

After monitoring, at 404, the nodes transmit status messages that specify the identified other nodes.

At 406, the master node receives the status messages.

At 408, the master node analyzes the status messages and generates a control message which assigns the nodes to a transmit sequence or multiple transmission opportunities, individual or shared, based on the status messages.

At 410, the master node transmits the control message to the network nodes, where the control message includes the transmit sequence or multiple transmission opportunities. In one embodiment, this control message could constitute the MAP, but in other embodiments, the control message could take other forms. The control message assigns mutually hidden nodes to different TXOPs, thus preventing possible collisions.

At 412, the network nodes receive the control message and transmit according to the transmit sequence or multiple transmission opportunities for the next MAC cycle.

Figure 5:
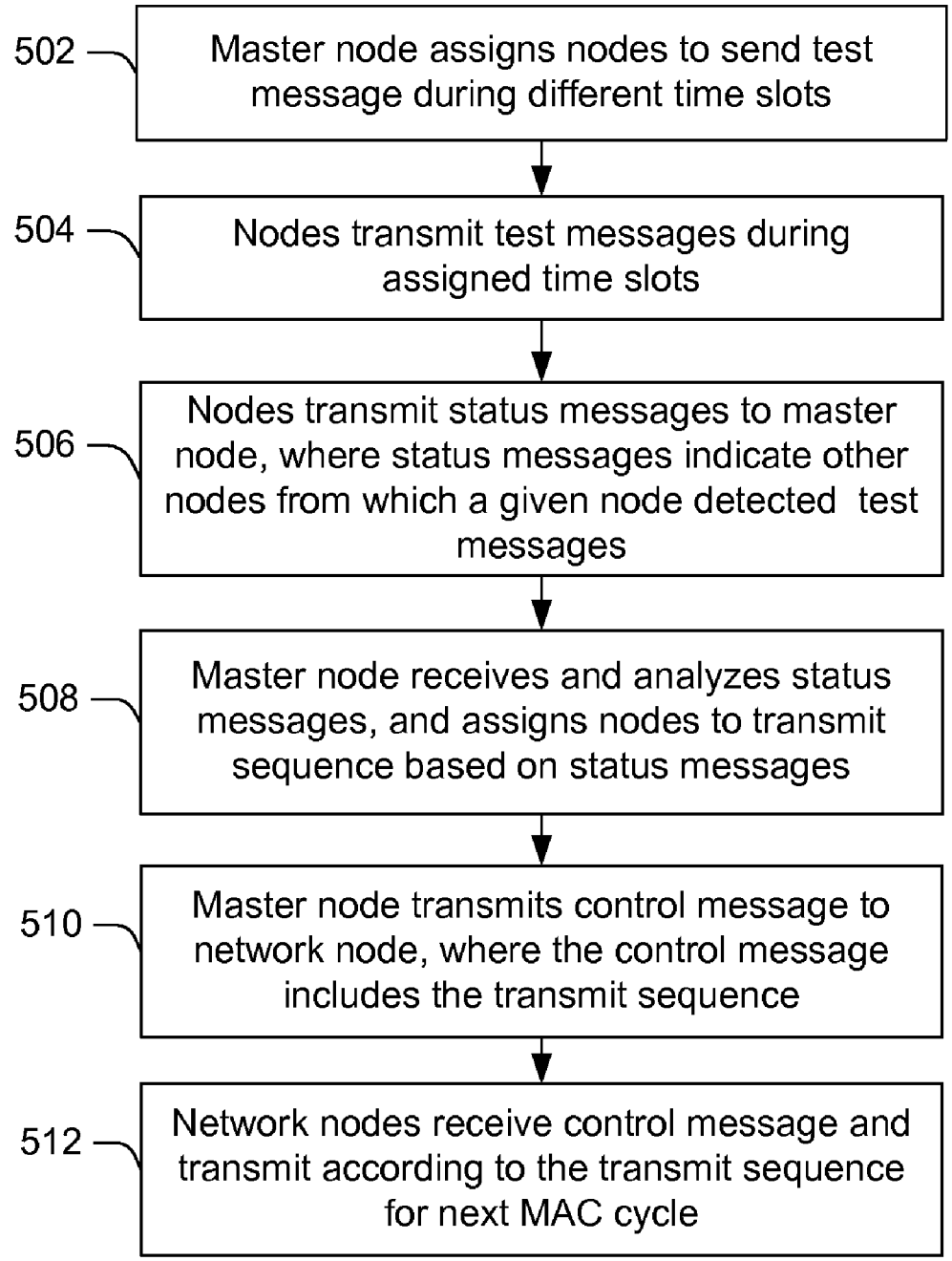
FIG. 5 shows a flowchart of another embodiment of adaptive communication in accordance with aspects of the invention.

FIG. 5 shows another method that could be used in accordance with aspects of the invention. At 502, the master node assigns each network node a different time slot to transmit a test message if there is no data message to transmit. In this way, if a node has a data message in its buffer, the node will transmit the data message to increase overall data throughput for the network. If the node doesn't have a data message to transmit, it transmits a test message, for example with dummy data, to provide other nodes with an opportunity to detect its presence or absence.

At 504, after the network nodes receive their respective time slots, the nodes transmit their respective test messages during the respective time slots.

At 506, the non-transmitting network nodes attempt to detect the test messages when a node transmits during its assigned time slot. If a monitoring node can detect the test message, the transmitting node is visible to that node. If the monitoring node cannot detect the test message, the transmitting node is hidden relative to the monitoring node. This block 506 could often be carried out in an iterative manner so all nodes are tested.

At 508, the network nodes send status messages to the master node. These status messages indicate whether each node is a hidden node or a visible node relative to the network node transmitting the status message.

At 510, the master node receives and analyzes the status messages and assigns the network nodes to transmission opportunities as discussed in blocks 406, 408. At 512, the network nodes receive the control message and transmit in accordance therewith for future communications.

Figure 8:
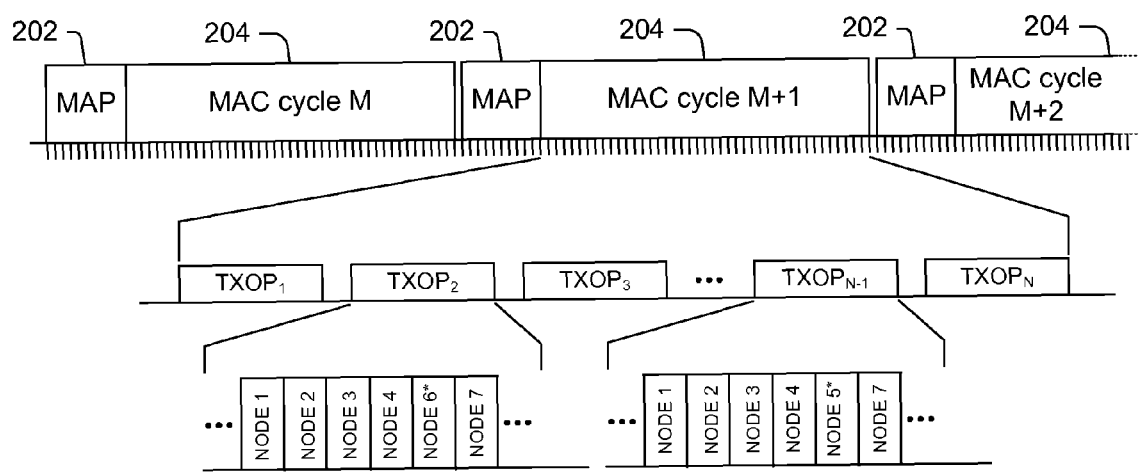
FIG. 8 shows one embodiment of a series of access cycles structured to avoid data errors of FIG. 7.

To appreciate some contexts in which aspects of the invention may be advantageous, FIG. 6-8 are now presented. Although these figures show some advantages of aspects of the invention, these advantages are not limiting in any manner. Other advantages are also contemplated as falling within the scope of the invention depending on the context in which the invention is used.

FIG. 6 depicts a shared transmission opportunity 600 assigned to seven network nodes (Node 1, Node 2, ... Node 7), such as $TXOP_N$ as previously depicted in FIG. 2. A discussion of one embodiment of a set of rules that could be used during this shared transmission opportunity 600 is now set forth. As shown, each node obtains a start time slot 602 in which the node is allowed to start transmission. If a node starts transmission during its start time slot 602, the other nodes will detect the transmission (using carrier sense) and wait for the transmitting node to finish transmission. If the node does not start transmission during its start time slot 602, however, the other nodes will move on to the start time slot 602 for the next node in the shared transmission opportunity 600. Thus, in some respects the nodes compete for the bandwidth of the shared transmission opportunity.

More particularly, in the illustrated example, at time 604 (prior to Network Node 1's start time slot 602), Network Node 1 is ready to transmit a frame. Thus, Network Node 1 transmits 606 during its start time slot 602. To verify the end of Network Node 1's transmission, the other nodes wait for a gap 608 in the communication stream, where the gap 608 has a sufficiently long duration so that it is statistically indicative of the end of Network Node 1's transmission. Network node 2 does not transmit during its start timeslot 602, so the sequence moves on to the Network Node 3's start timeslot 602. Similarly, Networks Nodes 3 and 4 do not transmit during their respective start timeslots 602. At time 610, network nodes 5 and network node 6 become ready to transmit frames. Thus, Network Node 5 transmits 612A during its start timeslot 602. As Node 5 starts transmission, Node 6 which is scheduled for the next start timeslot 602, detects that Node 5 is transmitting and backs off its own transmission until Node 5 completes the transmission and a gap 608 expires. Then Network Node 6 transmits 614A during its start timeslot 602. This set of rules is relatively efficient in many circumstances.

Network Node 5 is able to complete transmission because Network Node 6 successfully detected transmission of Node 5 on the medium.

While FIG. 6's set of rules may be sufficient in some implementations, it can cause significant bit errors as a result of collision if there are hidden nodes in the network, absent countermeasures. FIG. 7 shows one manner in which bit errors can be caused. In this example, which uses the same sequence as FIG. 6's example, it is assumed that Network Node 5 is hidden relative to Network Node 6. Now when network node 5 transmits 612B at its start timeslot 602, network node 6 does not detect its transmission. Therefore, network node 6 thinks network node 5 is not transmitting. Thus, network node 6 transmits prematurely 614B at time 620 (while network node 5 is still transmitting). Because both network nodes are transmitting during the time immediately following 620 their signals will collide, causing bit errors for these network nodes.

FIG. 8 shows one example of how aspects of the invention may remedy the shortcomings of FIG. 7. In FIG. 8, the nodes have monitored messages from one another and have provided status messages to the master node as previously discussed. The master node has now provided a MAP such that the hidden nodes (e.g., Network Node 5 and Network Node 6) transmit during different transmission opportunities. In this way, the hidden nodes can be isolated from one another to limit signal collisions therebetween, which may increase the overall throughput of the network. Although FIG. 8 shows an embodiment where the hidden nodes (Network Nodes 5 and Network Node 6) transmit during different shared transmission opportunities, in other embodiments at least one of the hidden nodes could also transmit during a dedicated transmission opportunity.

While examples of the invention have been illustrated and described with respect to one or more implementations, alterations and/or modifications may be made to the these examples without departing from the spirit and scope of the appended claims. In regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of communicating in a network with a plurality of nodes, comprising:
    gathering information from the plurality of nodes where information from each node specifies other nodes from which the node detected a transmission;
    based on the gathered information, determining a transmit sequence made up of a plurality of transmission opportunities according to which the plurality of nodes are to transmit, wherein at least two nodes that detected the transmission from one another are assigned to a shared transmission opportunity.

2. The method of claim 1, wherein nodes that were unable to detect transmissions from one another are assigned to different transmission opportunities within the transmit sequence.

3. The method of claim 1, where the at least two nodes compete for medium access during the shared transmission opportunity according to a set of rules.

4. A master node adapted to be associated with a network, comprising:
   a receiver adapted to receive a plurality of status messages from a plurality of nodes, where a status message from a node specifies other nodes from which the node detected messages; and
   analysis circuitry adapted to analyze the status messages and assign the plurality of nodes to transmission opportunities based at least in part on the status messages, wherein the analysis circuitry is adapted to assign nodes that fail to detect transmissions from one another to different, non-overlapping transmission opportunities.

5. The master node of claim 4, wherein the analysis circuitry is adapted to assign at least two nodes that detect messages from one another to a shared transmission opportunity.

6. The master node of claim 4, further comprising:
   a transmitter adapted to transmit at least one control message to the plurality of nodes, where the at least one control message specifies the transmission opportunities in which the plurality of nodes are to transmit.

7. A method of communicating over a network, comprising:
   sending a first control signal from a master node to a plurality of network nodes, wherein the first control signal assigns the plurality of network nodes to a plurality of respective timeslots during which the network nodes are to transmit respective test messages;
   at a first network node, attempting to detect test messages sent from other network nodes during the other nodes' respectively assigned timeslots;
   transmitting a status message from the first network node to the master node, where the status message specifies other network nodes from which the first network node detected a test message;
   based on the status message, sending a second control signal from the master node to the plurality of network nodes, where the second control signal assigns the plurality of network nodes to transmit according to a transmission sequence.

8. The method of claim 7, further comprising:
   assigning the first network node to a shared transmission opportunity with another network node from which the first network node detected a test message.

9. The method of claim 7, where a test message is transmitted during a timeslot assigned to a second network node, such that the first network node can correlate the test message to the second network node via the timeslot.

10. The method of claim 7, where a test message is transmitted along with a node ID of a second network node that transmitted the test message, such that the first network node can correlate the test message to the second network node.

11. The method of claim 7, where a test message is transmitted over an assigned frequency or modulation method assigned to a second network node, such that the first network node can correlate the test message to the second network node.

12. The method of claim 7, further comprising:
   assigning the first network node to a different transmission opportunity than other network nodes from which the first network node was unable to detect a test message.

* * * * *